March 21, 1961     KUNJU CHATANI     2,975,689
PHOTOGRAPHIC CAMERA

Filed Aug. 20, 1956     4 Sheets-Sheet 1

INVENTOR.
KUNJU CHATANI
BY
Morgan, Finnegan, Durham & Pine
ATTORNEYS

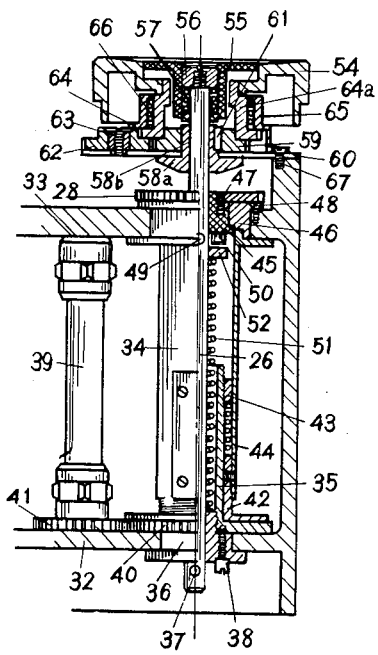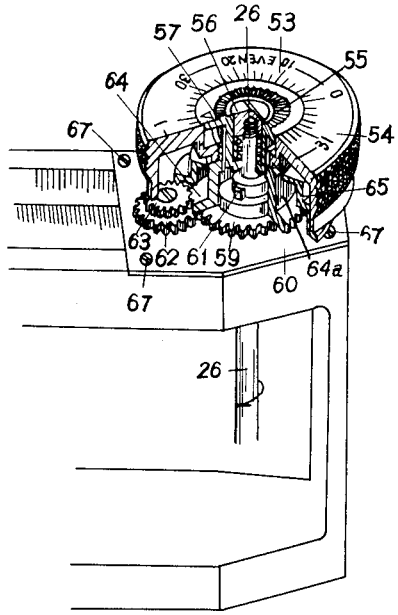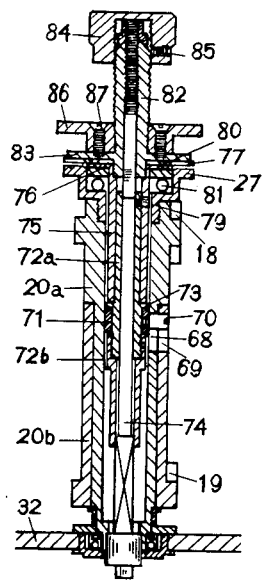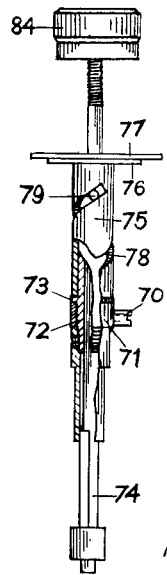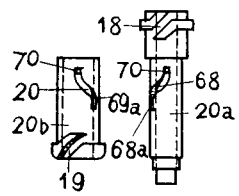

March 21, 1961   KUNJU CHATANI   2,975,689
PHOTOGRAPHIC CAMERA
Filed Aug. 20, 1956   4 Sheets-Sheet 3
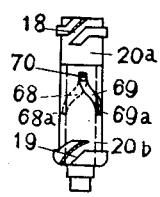
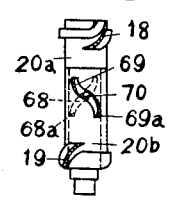
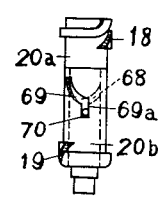
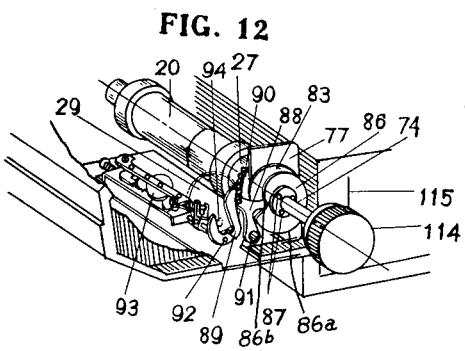
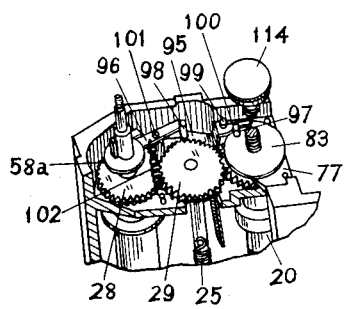
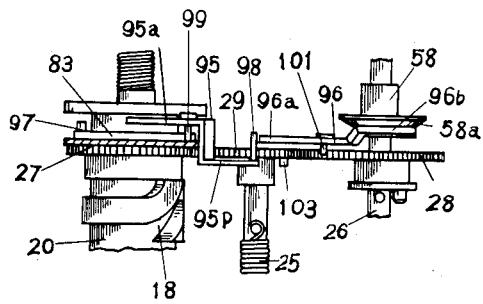
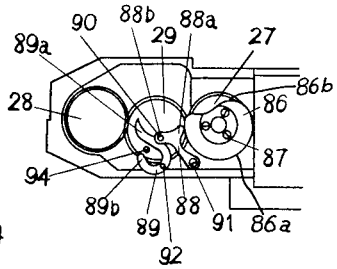
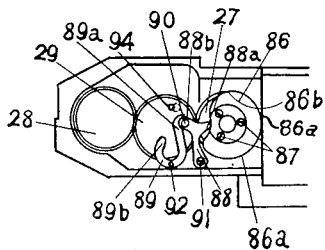
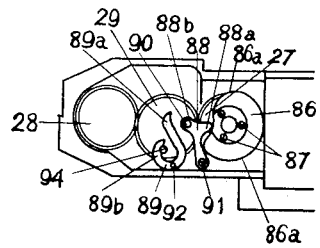
INVENTOR.
KUNJU CHATANI
BY
Morgan, Finnegan, Durham & Pine
ATTORNEYS March 21, 1961 KUNJU CHATANI 2,975,689
PHOTOGRAPHIC CAMERA
Filed Aug. 20, 1956 4 Sheets-Sheet 4

INVENTOR.
KUNJU CHATANI
BY
Morgan, Finnegan, Durham & Pine
ATTORNEYS

United States Patent Office 2,975,689
Patented Mar. 21, 1961

2,975,689

PHOTOGRAPHIC CAMERA

Kunju Chatani, 136 Midorigaoka-cho, Uchide, Ashiya, Japan

Filed Aug. 20, 1956, Ser. No. 604,942

18 Claims. (Cl. 95—31)

The invention relates to a photographic camera in which the shutter is positioned near the focal plane, immediately in front of the film and runs from one side of the picture area to the other in a transverse direction to the length of the film.

Such shutters are known as "focal plane shutters." In known types of focal plane shutters two blind curtains are provided, one directly in front of the other and as close to it as practical, and each curtain runs between its own pair of rollers situated on opposite sides of the picture area, in the same direction as the length of the film.

In this known type of shutter there are many disadvantages:

(1) The mechanism is complicated;
(2) The body of the camera must withstand the strong jerking or vibration due to the high speed of the roller blind curtains;
(3) The shutter mechanism does not always function efficiently, the roller blind curtains of rubber-cloth being affected by changes in temperature;
(4) The image of a rapidly moving object may be distorted due to the fact that the entire image is exposed successively in sections from one side of the film or plate to the other side as the slit between the two curtains passes across the face of the sensitized material in the direction of its length.

It is among the objects of the invention to provide a focal plane shutter in which the disadvantages described above are avoided.

The focal plane shutters according to the invention run in front of the film from one side of the picture area to the other, in the transverse direction to the length of the area. In most focal plane shutter cameras the picture area is formed with sides in the ratio of 2/3, for example, 24 x 36 mm., the curtains running in the direction of the longer side, which coincides with the direction of the length of the film.

The stroke of the focal plane shutters according to the invention is, therefore, shortened to 2/3 of that of known forms, and the distortion of the image of a rapidly moving object is thereby lessened.

According to the invention furthermore, the shutters consist not of two cloth curtains each running between a pair of rollers, but of two sets of thin metal blades, each of which is formed so that the two blades overlap when out of use and each being moved by its own lever. The shutter mechanism thus takes up less room in the body of the camera than the known curtain blind type of focal plane shutters. Furthermore by using metal shutters their smooth running will not be affected by variations of atmospheric temperature.

It is a further object of the invention to reduce shock, jerking or vibration to the body of the camera in spite of the considerably high running speed of the shutter by counter-balancing each set of shutter blades by a weight connected to a lever.

In focal plane shutter cameras, the shutters are required to run at high speeds. In the photographic camera according to the invention the high speed of the shutters may be obtained by pivoting each shutter blade lever in a position at one end of the blade. Thus the balance of weight on the two ends of the lever, that is, the shutter blade and the counter-poising member, prevents jerking or vibrations to the camera and the shutter blades may be moved easily by a touch of the counter-poise.

It is a further object of the invention to move the two sets of shutter blades by a single rotor which rotates by means of the motive energy of a spring on releasing the shutter and providing the counter-poising members as slides on a single rail and by positioning the rotor parallel to the rail, the rotor being provided with cylindrical cams corresponding to the slides on the rail. In this way the rotor controls the shutter movement.

According to the invention furthermore, the exposure time may be varied in three ways:

(1) by varying the width of the slit between one set of shutter blades and the other;
(2) by varying the time lag between the movement of the two blades;
(3) by varying the running speed of the shutter blades.

In the first variation the adjustment of the slit width is attained by alteration of the phase difference between two cams on the rotor, which are of corresponding shape. This method is used for controlling fast exposure time. In the second, variation is attained by governing the rotation of the rotor to slow speeds and ensuring that there is a short interval of time after the first cam of the rotor has moved the first shutter blades before the second cam moves the second shutter blades. This method is used when a greater range of exposure times are required. The third variation is attained by varying the tension of the spring which provides the motive energy sources for the shutters. This third method may be used in conjunction with the second or the first to ensure that the shutter speed is fast in a short exposure time, and slow in a long exposure time, while the jerking or vibration which would be caused by an unnecessarily high speed of the shutters on a relatively long exposure time is prevented.

The photographic camera according to the invention is illustrated by way of example in the accompanying diagrammatic drawings, in which:

Figure 6 shows, partly in longitudinal section, means for releasing the shutter and means for moving the film relatively to a driving shaft for setting the shutter;

Figure 7 is a perspective view of the turning knob of the driving shaft and a release button in quarter section;

Figure 8 shows, in longitudinal section, means for controlling the phase difference between two cams of the rotor;

Figure 9 shows the controlling device in Figure 8 partly in longitudinal section;

Figure 10 shows the cam rotor separated into two parts;

Figure 11a shows the cam rotor when its two cams are in the same phase;

Figure 11b shows the cam rotor when the two cams are in the position of half the maximum phase difference;

Figure 11c shows the cam rotor when the two cams are in the position of maximum phase difference;

Figure 12 is a perspective view of means for governing the rotation of the gearing;

Figure 13a is a plan view of Figure 12 when the brake finger is in a non-operative position;

Figure 13b is a plan view if Figure 12 with the brake finger in the operative position;

Figure 13c is a plan of Figure 12 showing a situation in which the brake finger is governing the rotation of the gearing;

Figure 14 is a perspective view of means for operating "bulb" and "time" exposure;

Figure 15 is a side view of the principal mechanism of Figure 14;

Figure 1:
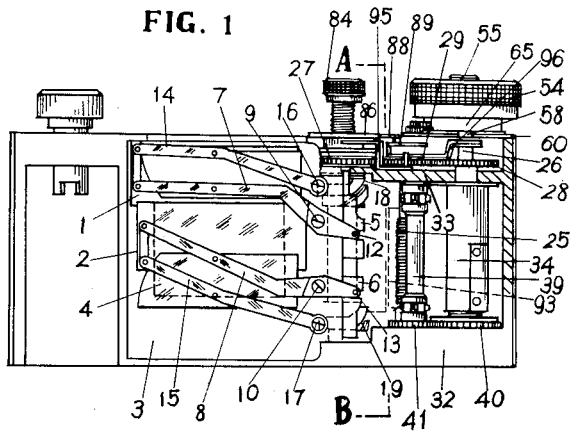
Figure 1 illustrates a back view of the camera.
Figure 3:
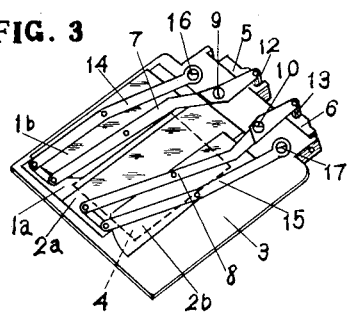
Figure 3 is a perspective view of the shutter.

In carrying the invention into effect according to the construction illustrated in the drawings, the shutter according to the invention is placed near the focal plane, immediately in front of the film and consists of two sets of thin metal blades; the first shutter blades 1 and the second shutter blades 2. As shown in Figures 1 and 3, both sets of the blades 1, 2 are disposed in the window frame 3 in a direction transversely of the length of the film and cover the window of the picture area 4. The long side of the picture area coincides with the direction of the length of the film. Each set of blades 1, 2 is connected with a slide 5, 6 by its own lever 7, 8, which is pivoted on the window frame 3 at one side of the picture window 4, 9, 10 being the pivots of the levers 7, 8 respectively. Both slides 5, 6 are disposed on a single rail 11 which is constructed vertically by a side of the window frame 3, the vertical movement of the slides 5, 6 controlling the transverse movement of the shutter blades 1, 2 and thereby the opening and shutting of the picture window 4 in a direction transversely of the length of the film. 12, 13 are the connecting pins of levers 7, 8 with the slide 5, 6. Each set of the shutter blades 1, 2 is formed with a main blade 1a, 2a and a following blade 1b, 2b secured to lever 7, 8 and a subsidiary lever 14, 15 substantially parallel to the lever 5, 6 and pivoted at the end near the pivots 9, 10 of the levers 7, 8 on the window frame 3. 16, 17 are the pivots of the subsidiary levers 14, 15. The ends of each set of levers 7, 14 or 8, 15 remote from the pivots 9, 10 are connected to the corresponding side of the main blade 1a, 2a, the levers being also connected at positions within their length to the following blades 1b, 2b, the following blades 1b, 2b overlapping part on the main blades 1a, 2a. The overlapping part may vary with the movement of the shutter blades 1, 2. Advantageously in the construction illustrated in the drawings, the overlapping part of one part of shutter blades, a main blade and a subsidiary blade is small at the beginning of the stroke and wider at the end of the stroke, while that of the second pair is the reverse.

The running speed of the shutter blades 1, 2 is controlled by the vertical sliding speed of the slides 5, 6 on the rail 11. As shown in Figures 1 and 3, the levers 7, 8, which connect the shutter blades 1, 2 to the slides 5, 6, are pivoted at an end position to the slides 5, 6. The shutter blades 1, 2 may, therefore, run at a high speed in comparison with the sliding speed of the slides 5, 6, the weight of the slides 5, 6 being sufficient to balance that of the shutter blades 1, 2 and thereby avoid the undesirable jerking or vibration of the body of the camera due to the very large momentum of the shutter blades 1, 2. The balance between the blades 1, 2 and the slides 5, 6 is effective not only in avoiding the jerking or vibration but also for moving the blades 1, 2 lightly, smoothly, sensitively and accurately.

Figure 2:
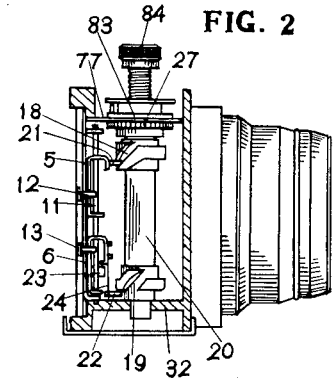
Figure 2 is a transverse section on the lines A—B of Figure 1.
Figure 4:
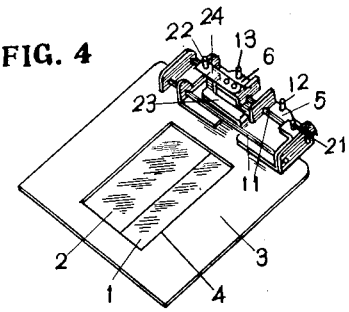
Figure 4 is a reverse perspective view of Figure 3.

The slides 5, 6 slide vertically on the rail 11 upwards on setting the shutter, and downwards on releasing, being guided by cams 18, 19 of a rotor 20 as shown in Figure 2. The rotor 20 which stands adjacent to the rail 11, has two cylindrical cams; the first cam 18 corresponding to the first slide 5 and the second cam 19 corresponding to the second slide 6. Both cams 18 and 19 are grooved in the same spiral form and guide their corresponding slides 5, 6 by the guide-pins 21, 22 when the rotor 20 rotates. Any phase difference between the cams 18 and 19 causes a difference between the starting time of the slide 5 and that of the slide 6 and thus produces a slit between the first shutter blades 1 and the second shutter blades 2. In the shutter mechanism according to the invention it is necessary that there should be no slit between the first and the second shutter blades 1 and 2 on setting the shutter and this is effected as follows:

As shown in Figure 4, the second slide 6 is supported and followed by the first slide 5 at a determined distance. 23 is the support provided in the first slide 5 for the second slide 6. While the guide-pin 21 corresponding to the first cam 18 stands directly on the first slide 5, the guide-pin 22 corresponding to the second cam 19 stands on a spring plate 24 mounted on the second slide 6. In setting the shutter, as the rotor 20 rotates clockwise the first slide 5 is moved upwards by the guide of the first cam 18, while the second slide 6 moves upwards not by the guide of the second cam 19 but together with the first slide 5 by its traction, the guide-pin 22 being not guided by the second cam groove 19 but passing over the surface where there is no groove path under operation of the spring plate 24. The lower corner circumference of the second cylindrical cam 19 is planed off so that the guide-pin 22 may climb on the surface. Any accidental exposure on setting the shutter may, therefore, be prevented without difficulty. On releasing the shutter, when the rotor 20 rotates counter-clockwise, each slide 5, 6 moves downwardly guided by its own cam 18, 19.

Figure 5:
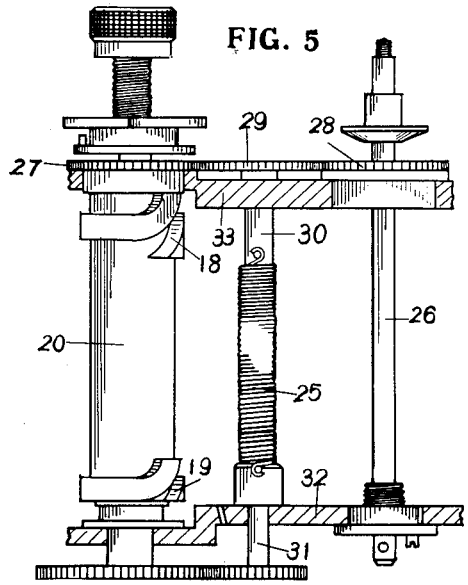
Figure 5 shows the gearing between the rotor, the spring of the motive energy source for running the shutter and a driving shaft.

Figure 5 shows the gearing between the cam rotor 20, a spring 25 providing the motive energy for shutter-work and a driving shaft 26. The rotor 20, the coil spring 25 and the driving shaft 26 are parallel to each other and are connected by a gear train. 27 is the gear of the rotor 20, 28 is the gear of the driving shaft 26, and 29 is the intermediate gear between the gears 27 and 28. The upper end of the coil spring 25 is secured to the arbor 30 of the intermediate gear 29 while the other end is secured to another arbor 31 which may be either secured to the lower frame 32 of the body of the camera or connected by gearing to another mechanism as described later. 33 is the upper frame of the body. When the driving shaft 26 is turned clockwise in the construction shown in the drawings, the arbor 30 of the intermediate gear 29 and the rotor 20 are turned simultaneously by gearing 28, 29 and 27; the arbor 30 twists the coiled spring 25 to build up the motive energy for running the shutter, while the rotor 20 moves the slides 5, 6 upwardly to set the shutter as hereinbefore described.

Means for moving the film are shown in Figure 6 of the drawings. The driving shaft 26 for setting the shutter passes through the film winding reel 34 which is disposed between the upper and the lower frames 33 and 32. The reel 34 surrounds a flanged pipe 35, which is supported on the lower frame 32 and is secured to a bush 36 as by screw-threading. The bush 36 is set in the lower frame 32. The rotation of the driving shaft 26 is transmitted to the reel 34 through cross pins 37, 38 between the driving shaft 26 and the bush 36, and by means of friction between the flanged pipe 35 and the reel 34. A pin 37 is provided on the shaft 26 near its lower end and is in contact with and perpendicular to the pin 38 provided on the bottom face of the bush 36. When the shaft 26 is turned to set the shutter, the film is moved to the reel 34 and the danger of double exposure is avoided. 39 is the film measuring roller which is connected with the flange pipe 35 by gears 40, 41. The gear 40 may be formed on the circumference of the flange of the pipe 35. Another flanged pipe 42, which is secured to the reel 34 as by screw-threading, forms the base of the reel 34, 43 is a ring mounted on the top of the flanged pipe 34 and 44 is a spring provided between the ring 43 and the upper end of the base pipe 42.

The boss 45 of the driving gear 28, through which the driving shaft 26 passes is provided to withstand the rotating friction of the shaft 26 and is fitted in the bush 46 secured in the upper frame 33. 47 is a screw securing the gear 28 to the boss 45, and 48 a screw securing the bush 46 to the upper frame 33. The rotation is carried from the shaft 26 to the gear 28 by means of cross pins 49, 50. While the rotation of the shaft 26 is transmitted to the gear 28 and the reel 34 as described above, the thrust movement of the shaft 26 has no effect on the gear 28 or the reel 34. Normally the pin 49 of the shaft 26 is kept in contact with the pin 50 of the gear boss 45 by the spring force of a coiled spring 51, which is provided between a shoulder 52 of the shaft 26 and the top of the bush 36 inside the flanged pipe 35. When the shaft 26 is pushed axially downwards contact between the pins 49 and 50 is lost and the shutter mechanism is released. At this time the effective exposure is made. 53 in Figure 7 is the graduation on the knob 54 for turning the shaft, indicating the number of frames of the film which have been moved.

The knob 54 for turning the shaft 26 and the release button 55 for pushing the shaft 26 axially downwards are illustrated in Figures 6 and 7. The release button 55 is mounted on the top of the shaft 26. 56 is the securing screw of the button and 57 is a spring between the screw 56 and the inside of the base of the button 55. The knob 54 surrounds the release button 55 at the same height. In the example illustrated in the drawings, a sleeve 58 with a bevel shoulder 58a is secured to the shaft 26 and a gear 59, which is provided on the cover plate 60, is fitted with a key 61 to the outside of the boss 58b of the sleeve 58. The gear 59 is connected through gears 62, 63 to a gear 64 secured to the knob 54 by screw-threading. 65 is the casing for the gearing. In order both to prevent the driving shaft 26 from recoiling on setting the shutter and to obtain the secure set of the shutter, a coil spring 66, the upper end of which is fixed to the casing 65, is tightly wound around the boss part 64a of the gear 64 as a ratchet. 67 is a screw securing the casing 65 to the cover plate 60. Thus, the turn of the knob 54 in one direction, for example, in a clockwise direction, motion is transmitted through the gearing 64, 63, 62 and a key 61 to the sleeve 58 secured to the driving shaft, while it is impossible for the knob 54 to turn in the opposite direction, that is, counter-clockwise, due to the spring ratchet 66.

Means for varying the phase difference between the first and the second cams 18 and 19 of the rotor 20 in order to vary the width of the slit between the first and the second sets of shutter blades 1 and 2, thereby effecting the control of the exposure time, are illustrated in Figures 8, 9, 10, 11a, 11b and 11c of the drawings.

The rotor 20 is formed with a first cam pipe 20a and a second cam pipe 20b which is fitted to the outside of the lower part of the first pipe 20a. The first pipe 20a, which is provided with the first cam 18, stands vertically on the upper frame 33 and is secured to the gear 27 connected to the shaft 74. Each pipe 20a, 20b has a spiral symmetrically placed groove 68, 69. At the cross point of the two grooves 68 and 69 a guide-pin 70 stands on a ring 71 of the sliding lift 72 which is inside of the pipe 20a. The sliding lift 72 is a pipe which is formed with the upper part 72a and the lower part 72b formed by screw-threading and a ring 71 with the guide-pin 70 inserted between a shoulder 73 of the upper part 72a and the top of the lower part 72b. A lift-shaft 74 passes through the lift 72 and is square-fitted with the lower part 72b. A pipe 75 is provided between the outside of the upper part 72a of the lift 72 and the inside of the cam rotor 20. The pipe 75 is fixed at its flange 76 to a shelf 77 secured to the body and has a spiral guide groove 78, which guides the pin 79 provided at the top of the upper part 72a of lift 72. 80 is a screw securing the flange 76 to the shelf 77. 81 is the bearing cased by the gear 27. The lift-shaft 74 is the controlling shaft for varying the phase difference between the two cams 18 and 19. A sleeve 82 with a flange 83 is placed on the shelf 77 and the controlling shaft 74 passes through the shelf 77 by screw-threading. A knob 84 is mounted on the top of the shaft 74. 85 is a screw securing the knob 84 to the sleeve 82. When the controlling shaft 82 is turned, the square-fitted lift 72, turning with the shaft 82, slides along the shaft 82 up-or-down at the guide-pin 79 by the guide of the spiral groove 78 of the fixed pipe 75. At this time, the descending movement of the ring 71 with the guide-pin 70 turns the second cam pipe 20b, the guide-pin 70 being guided by the spiral groove 68 of the first cam pipe 20a and guiding the second pipe 20b along the spiral groove 69. In this movement, the ring 71 with the guide-pin 70 takes the rotating friction of the lift 72. Thus each part of the rotor 20a, 20b turns in the relatively opposite direction to each other so as to effect variation of the phase difference between the two cams 18 and 19. Since each spiral groove 68, 69 is symmetrically placed in relation to the other the guide-pin 70 may be guided smoothly and harmoniously along both spiral grooves 68 and 69 since the angle between the axis of the rotor 20 and the spiral curves of the grooves 68, 69 is small. In the example illustrated in the drawings, the clockwise movement of the controlling shaft results in an increase in phase difference. Figure 11a shows the rotor 20, when there is no difference between the cams 18 and 19. In such a case no exposure is effected. Figure 11b illustrates the case in which the phase difference between the two cams 18, 19 is half the maximum, that is when the width of slit between the two sets of shutter blades 1, 2 is half the width of the picture window 4. In the drawings the straight groove 68a, 69a is extended downwardly to the lower end of each spiral groove 68, 69. When the pin 70 is in the straight grooves 68a, 69a as shown in Figure 11c, the phase difference between the two cams 18, 19 is a maximum and consequently the width of the slit between the first and the second sets of shutter blades 1, 2 is equal to the width of the picture window 4.

Since the maximum width of the slit between the shutter blades 1 and 2 is limited to that of the picture window 4 means are required for effecting exposure for a longer time than that attainable by means of the first way.

According to the invention this requirement is satisfied by governing the rotation of the rotor 20 for a time after the first cam 18 is in operation during which the second cam 19 does not operate. Such means are illustrated in Figures 12, 13a, 13b and 13c. The controlling shaft 74 has a cam wheel 86 on the flange 83. 87 is a screw securing the cam wheel 86 to the flange 83. A T-shaped follower 88 which is pivoted on the shelf 77 at one end is always in contact with the cam wheel 86 at one top 88a and with one finger 89a of a U-shaped lever 89 at a pin 90 of the other top 88b. 91 is the pivot of the follower 88. The U-shaped lever 89 is placed over the intermediate gear 29, one finger 89a of the lever 89 being one step higher than the other 89b. The pivot 92 of the lever 89 is connected at its lower end to a low speed governor 93 which governs the pivot 92 in very slow rotation in one direction, the counter-clockwise direction according to the construction shown in the drawings. The spring force of the mechanism maintains the U-shaped lever 89, the T-shaped follower 88 and the cam wheel 86 in close contact. On the surface of the gear 29 a small pin 94 is provided near the circumference at the same height as the finger 89b. The cam wheel 86 is formed with a circular portion 86a and an involute portion 86b. When one top 88a of the follower 88 is in contact with the cam 86 at the circular portion 86a, the finger 89b is out of the way of the pin 94 and as shown in Figure 13a does not obstruct the rotation of the gear 29 at all. When the top 88a is in contact with the cam 86 at the involute portion 86b, the finger 89b is in the path of the pin 94. The position of pin 94 shown in Figure 13b is shifted to the position shown by a dotted line after about one counter-clockwise revolution on setting the shutter. On this shifting, though the finger 89b faces the pin 94 on its way, the counter-clockwise rotation of the pin 94 is not obstructed, since both the finger 89b and the pin 94 are planed off in this direction. On releasing the shutter, however, the pin 94, after rotating through an angle, for example, about 180°, is hooked by the finger 89b to stop as shown in Figure 13c. The stop of the pin 94 is effective to interrupt the rotation of the gear 29 and its connecting gearing. The pin 94 of the gear 29, when hooked by the finger 89b, is changed from rapid rotation into very slow rotation by operation of the slow speed governor 93. This very slow rotation of the gear 29 continues until the contact of the pin 94 with the lever 89 is lost, the finger 89b being pushed by the pin 94 out of the way of the pin 94. Thereafter the gear 29 and its connecting gearing start to rotate the remaining angle with the same velocity as in the first rotation. Thus, on the first rotation of the gearing the first cam 18 of the rotor 20 causes the first shutter blades 1 to run, and during operation of the governor 93 on the intermediate gear 29 neither the first nor the second cam 18 nor 19 has any effect on the shutter blades 1 or 2, while on the remaining rotation the second cam 19 causes the second shutter blades 2 to run. The pause during which the second shutter blades 2 do not work after the first shutter blades 1 have run, effects the exposure of the film. The exposure time therefore, depends upon the time during which the pin 94 does not lose contact with the finger 89b of the lever 89 after coming in contact with the finger 89b. This is determined by the position in which the U-shaped lever 89 is set, that is, by the position where the top 88a of the follower 88 is in contact with the cam wheel 86 at its involute portion 86b. Thus turning the shaft 74 with the cam wheel 86 effects the control of the exposure time. The circular portion 86a of the cam wheel 86 is used in controlling the width of the slit between the sets of shutter blades 1 and 2, and the straight grooves 68a and 69b of the rotor 20 are used in controlling the exposure time by this governing mechanism.

Figure 16A:
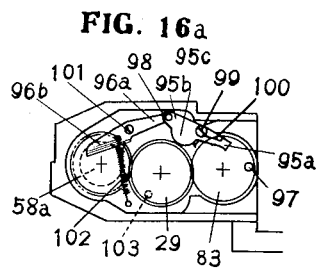
Figure 16a is a plan view of Figure 14 when the brake lever is in the normal position.
Figure 16B:
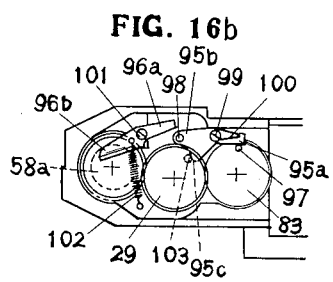
Figure 16b is a plan of Figure 14 with the brake lever set in the position for "bulb" exposure.
Figure 16C:
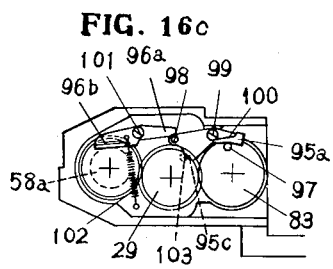
Figure 16c is a plan of Figure 14 set for "bulb" exposure.
Figure 16D:
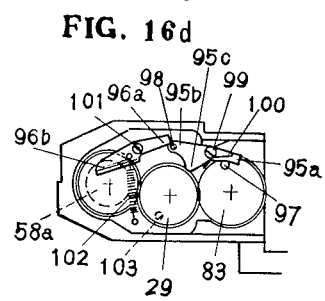
Figure 16d is a plan of Figure 14 on the "time" exposure.

In the photographic camera according to the invention, the "bulb" and the "time" exposure mechanism is provided as shown in Figures 14, 15, 16a, 16b, 16c and 16d. The mechanism comprises a brake lever 95 and a deflect lever 96 located between the flange 83 of the controlling shaft 74 and the bevel shoulder 58a of the driving shaft 26. One side 95a of the brake lever 95 is on the flange 83 on which a pin stands and the other side 95b, which is one step lower than the side 95a, has a projecting part 95c and a pin 98 at its end. 99 is the pivot of the brake lever 95. 100 is a spring, operating so as to place the one side 95a of the lever 95 at a large angle on the shoulder 58a. One end 96a of the deflect lever 96 fronts the pin 98 of the brake lever 95 and the other side 96b which is sloped like a knife is placed immediately under the bevel shoulder 58a. 101 is the pivot of the lever 96, and 102 is a spring operating so as to place the knife side 96b of the lever 96 at a large angle under the bevel shoulder 58a. On the back of the intermediate gear 29 a pin 103 stands near the circumference, in the construction as shown in the drawings, at the position on the surface symmetrical to the pin 94. Upon pushing down the driving shaft 26 for releasing the shutter, the bevel shoulder 58a deflects the knife side 96b of the lever 96. At the time the pin 97 is detached from the one side 95a of the lever 95 and the pin 98 at the end of the lever 95 stands aside from the way of the end 96a of the lever 96, as shown in Figure 16a, and therefore, the deflection of the lever 96 on pushing down the driving shaft 26 has no effect on the brake lever 95. For "bulb" exposure the brake lever 95 is set so that the pin 98 may stand in the way of the end 96a of the lever 96, the one side 95a of the brake lever 95 being pushed by the pin 97 on the flange 83, as shown in Figure 16b. When the driving shaft 26 is pushed down on releasing the shutter to deflect the knife side 96b of the lever 96, the other end 96a pushes the pin 98 of the brake lever 95 to set the projecting part 95c immediately under the gear 29. Accordingly, after rotating through an angle, for example, of 180°, the rotation of the intermediate gear 29 is interrupted at the pin 103 by the projecting part 95c of the brake lever 95. When the driving shaft 26 is released from pushing down each lever 96, 95 is reinstated in its formed position by its own spring, 102, 100 and the gear 29 and its connecting gearing start to rotate the remaining angle. Thus on the first rotation of the gearing the first cam 18 of the rotor 20 causes the first shutter blade 1 to run, during the interruption of the rotation by brake lever 95 the rotor remains stationary, and on the remaining rotation the second cam 19 causes the second shutter blades 2 to run. The effective "bulb" exposure is thus obtained. In case of the "time" exposure, the pin 97 of the flange 83 pushes the side 95a of the brake lever 95 a little more than in the case of the "bulb" exposure and the projecting part 95c of the lever 95 is set to the place which is on the path of the pin 103 of the gear, without operation of the deflect lever 96 as shown in Figure 16d. On releasing the shutter, therefore, after rotating through an angle, the gear 29 is interrupted in its rotation as well as in the case of the "bulb" exposure. The lever 96 does not participate in this working. Even if the driving shaft 26 is released from pushing down, therefore, the gear 29 does not immediately become free since the brake lever 95 is in contact with the pin 97. This effects a semi-permanent exposure after the first shutter blades 1 have run, to effect "time" exposure.

Figure 17:
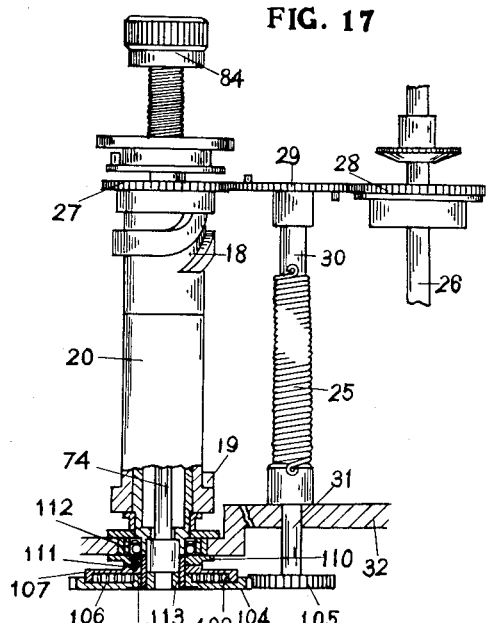
Figure 17 shows means for varying the tension of the spring for shutter-work for "time" exposure.
Figure 18:
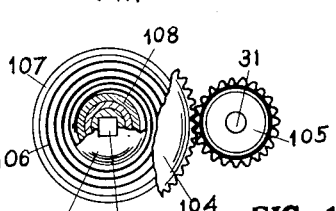
Figure 18 is a corresponding plan view partly in section.

As described above the exposure time may be varied at will within very wide ranges, for example, from a very short speed such as 1/1000 second to the "bulb" or the "time." According to the invention furthermore, the running speed of each set of the shutter blades 1, 2 may be varied by varying the tension of the spring 25 for running the shutter. Means for this purpose are illustrated in Figures 17, 18. The exposure controlling shaft 74 is connected by gears 104 and 105 to the lower shaft 31 secured to the lower end of the spring 25. On turning the controlling shaft 74 the tension of the coiled spring 25 is strengthened or weakened. In this case, the controlling shaft 74 and the lower frame 32 in order to at will in spite of the recoiling force of the spring 25. This is achieved by setting a spring between the controlling shaft 74 and the lower frame 32 in order to balance the variation of the tension of the spring 25. The spring for balancing is shown in the drawings as an involute spring 106 enclosed in a casing 107. The inner end of the involute spring 106 is secured to the boss 108 of the gear 106 and the outer end to the inner circumference 109 of the casing 107, which is formed like a coin, deposited on the gear 104 as a lid and fixed to the lower frame 32 of the body. 110 is a bush fixed to the frame 32; 111 is a screw securing the casing 107 to the bush 110; 112 is a bearing between the controlling shaft 74 and the bush 110; and 113 a device for securing the gear 104 to the controlling shaft. In the example illustrated in the drawings, the clockwise turning of the driving shaft 26 strengthens the tension of the coiled spring 25 from above and the clockwise turning of the exposure controlling shaft 74 also strengthens it from below. The variation of the tenison of the coiled spring 25 from the lower shaft 31 balances with that of the involute spring 106 automatically on turning the controlling shaft 74. The controlling shaft 74 may, therefore, be self-stopped at will at any point. Turning the controlling shaft 74 thus effects the variation of the shutter running speed and simultaneously the variation of the exposure time. The shutter speed dial 114 of the controlling knob 84 as shown in Figure 12 should be graduated to include three elements of the exposure variation: (a) the variation of the width of the slit between two sets of shutter blades 1, 2; (b) the variation of the pause during which the second shutter blades 2 do not start after the first 1 has started to run; and (c) the variation of the running speed of the shutter blades 1, 2. 115 is the arrow indicating the exposure time. Thus the shutter running speed is fast in the short exposure and slow in the long exposure. Advantageously this prevents jerking or vibration due to unnecessary high speed of the shutter blades 1, 2 in the relatively long exposure.

Figure 19:
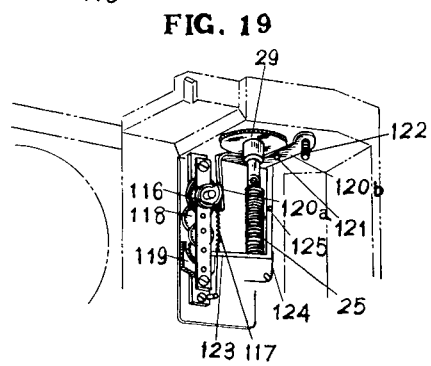
Figure 19 is a perspective view of means for self-timing the exposure.
Figures 20A, 20B:
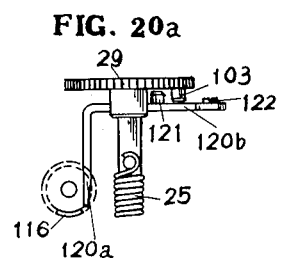
Figure 20a is a side view of the principal mechanism of Figure 19 on an enlarged scale when the self-timer has been set.
Figure 20b is a side view of the principal mechanism of Figure 19 on an enlarged scale when the self-timer has released the gearing from locking.

According to the invention, it is possible to provide a self-timing mechanism for the exposure. The mechanism is shown in Figures 19, 20a and 20b. A self-timer comprises a cam 116, a spring 117 operating on the cam 116, a governing gear train 118 and an escapement 119. One end 120a of a following lever 120 is always held in contact with the cam 116 by spring force and the other is pivoted on the upper frame 33. The upper part 120b of the follower 120 is placed immediately under the intermediate gear 29 and provides a pin 121 corresponding to the pin 103 on the brake of the gear 29. 122 is the pivot of the lever 120. Normally, as the pin 121 is out of the path of the pin 103 shown in Figure 20a the rotation of the gear is unrestrained. When the self-timer is set, being pushed by the projecting arc 116a of the cam 116, the lever 120 is shifted so that the pin 121 may come into the path of the pin 103 of the gear 29. The position of the pin 121 is thus close to the setting position of the pin 103 on setting the shutter. When the release button 55 is pushed down, the shutter mechanism is not immediately released by the check of the pin 121 of the lever 120 against the pin 103 of the gear 29 until the pin 121 of the lever 120 is deflected out of the way of the pin 103 after the operating time of the self-timer, the lever end 120a coming into contact with the sunken part 116b of the cam 116. Thus the self-timing exposure is obtained. 123 is the lever catching the escapement 119; 124 is a spring operating on the lever 123; and 125 is the pivot of the lever. When the release button is pushed down, the catch of the escapement 119 by the lever is released to drive the gearing 118 into operation by spring force of the spring 117.

I claim:

1. A photographic camera of focal plane shutter type, in which the shutter comprises a pair of blade groups, each group consisting of two partly overlapping blades connected by two substantially parallel levers which are pivoted on the window frame at one side of the picture window, each of said two levers being connected at the end of its length to the lower blade in the proximity of its side edge distant from said lever pivot and at the middle of the length to the upper blade at the central part, one of said two levers for connecting each blade group being provided with means for driving it, so that the overlapping area of each blade group may be varied by moving said levers within the scope from a minimum overlap position in which each blade group wholly blinds the picture window to a maximum overlap position in which each blade group lies entirely clear of the picture window and in which the pair of blade groups are also connected respectively by said levers to counter-poising members at the position beyond the pivots of the levers.

2. A photographic camera of a focal plane shutter type according to claim 1, in which the counter-poising members of the shutter blade groups are formed as slides on a single guide rail.

3. A photographic camera of focal plane shutter type, in which the shutter comprises a pair of blade groups, each group consisting of two partly overlapping blades connected by two substantially parallel levers which are pivoted on the window frame at one side of the picture window, each of said two levers being connected at the end of its length to the lower blade in the proximity of its side edge distant from said lever pivot and at the middle of the length to the upper blade at the central part, one of said two levers for connecting each blade group being provided with means for driving it, so that the overlapping area of each blade group may be varied by moving said levers within the scope from a minimum overlap position in which each blade group wholly blinds the picture window to a maximum overlap position in which each blade group lies entirely clear of the picture window and in which one slide is provided with means for engaging the other slide with a determined distance between both slides only in one sliding direction which coincides with the direction of movement of the slides on setting the shutter.

4. A photographic camera of focal plane shutter type, in which the shutter comprises a pair of blade groups, each group consisting of two partly overlapping blades connected by two substantially parallel levers which are pivoted on the window frame at one side of the picture window, each of said two levers being connected at the end of its length to the lower blade in the proximity of its side edge distant from said lever pivot and at the middle of the length to the upper blade at the central part, one of said two levers for connecting each blade group being provided with means for driving it, so that the overlapping area of each blade group may be varied by moving said levers within the scope from a minimum overlap position in which each blade group wholly blinds the picture window to a maximum overlap position in which each blade group lies entirely clear of the picture window and in which a rotor is provided parallel to the guide rail of the slides and is formed with two cams engaging with said slides respectively so as to move the corresponding slides when the rotor rotates.

5. A photographic camera of a focal plane shutter type according to claim 4, in which the rotor is connected through a gear train to a spring providing motive energy for driving the shutter blades and a driving shaft.

6. A photographic camera of a focal plane shutter type according to claim 5, in which the driving shaft is prevented from recoiling by a ratchet.

7. A photographic camera of a focal plane shutter type according to claim 5, in which the film is transferred to a winding reel by the driving shaft simultaneously with the setting of the shutter.

8. A photographic camera of a focal plane shutter type according to claim 5, in which the rotation transmitted from the driving shaft to the driving gear for setting the shutter is effected by means of cross-pins and in which the contact of said cross-pins may be released by pushing the said driving shaft axially downwards.

9. A photographic camera of a focal plane shutter type according to claim 4, providing with means for governing the rotation of the rotor in a very slow speed for a time after one of the two cams of the rotor has operated to move the first shutter blade during which the other cam for driving the second shutter blade does not operate.

10. A photographic camera of focal plane shutter type according to claim 9 in which means for governing the rotation of the rotor comprises a low speed governor, a hook lever pivoted on said governor, a corresponding member on a gear of the gearing for driving the shutter to be engaged with said hook lever at a rotating angle of the gear on releasing the shutter and means for controlling the set position of the hook lever.

11. A photographic camera of focal plane shutter type according to claim 10, in which said means for controlling the set position of the hook lever comprises an involutely shaped cam wheel provided with a controlling shaft and a follower which engages with both said cam wheel and the hook lever.

12. A photographic camera of focal plane shutter type according to claim 10, in which the controlling shaft for controlling the set position of the hook lever is the same as that for controlling the phase difference between both cams of the rotor.

13. A photographic camera of a focal plane shutter type according to claim 12 in which the cam wheel is formed with the involute portion and the circular portion, so that the plane difference between both cams of the rotor may be controlled when the follower is in contact with the cam wheel at its circular portion.

14. A photographic camera of focal plane shutter type, in which the shutter comprises a pair of blade groups, each group consisting of two partly overlapping blades connected by two substantially parallel levers which are pivoted on the window frame at one side of the picture window, each of said two levers being connected at the end of its length to the lower blade in the proximity of its side edge distant from said lever pivot and at the middle of the length to the upper blade at the central part, one of said two levers for connecting each blade group being provided with means for driving it, so that the overlapping area of each blade group may be varied by moving said levers within the scope from a minimum overlap position in which each blade group wholly blinds the picture window to a maximum overlap position in which each blade group lies entirely clear of the picture window and in which two cams of the rotor have the same cylindrical form.

15. A photographic camera of a focal plane shutter type according to claim 14, in which the rotor is formed with two tubes, one being fitted to the outside of the other and secured to the end of a gear train for driving the shutter, each tube having a cam for engaging with its own corresponding slide on the guide rail and a spiral groove symmetrical to each other and in which a guide pin is provided at the cross point of these two grooves as the connecting member of said two tubes and is movable up and down by turning a controlling shaft, so that the phase difference between both cams of the rotor may be varied at will.

16. A photographic camera of a focal plane shutter type according to claim 15 in which straight axial grooves extend from the respective ends of the spiral grooves of the rotor.

17. A photographic camera of a focal plane shutter type according to claim 16 in which the guide pin at the cross point of two grooves of the rotor is fitted without constraint of its rotation to a lift which is passed through by the controlling shaft and movable up and down by turning the controlling shaft.

18. A photographic camera of a focal plane shutter type according to claim 17 in which said lift is slidably square-fitted to the controlling shaft and engages with a spirally grooved cam fixed to the camera body so as to be moved up or down by the guide of the fixed spiral cam when the controlling shaft is turned.

References Cited in the file of this patent

UNITED STATES PATENTS

| | | |
|---|---|---|
| 2,195,330 | Hineline | Mar. 26, 1940 |
| 2,222,041 | Moomaw | Nov. 19, 1940 |
| 2,608,922 | Studdert | Sept. 2, 1952 |
| 2,655,847 | Harvey | Oct. 20, 1953 |
| 2,664,800 | Mayo | Jan. 5, 1954 |

FOREIGN PATENTS

| | | |
|---|---|---|
| 514,432 | Belgium | Oct. 15, 1952 |
| 514,463 | Belgium | Oct. 15, 1952 |
| 514,492 | Belgium | Oct. 15, 1952 |
| 533,860 | Great Britain | Feb. 21, 1941 |
| 663,252 | Great Britain | Dec. 19, 1951 |
| 459,801 | Italy | Oct. 6, 1950 |